United States Patent
Gier et al.

(10) Patent No.: US 6,790,532 B1
(45) Date of Patent: Sep. 14, 2004

(54) COATING COMPOSITION, BASED ON ORGANICALLY MODIFIED INORGANIC CONDENSATES

(75) Inventors: Andreas Gier, Melle (DE); Martin Mennig, Quierschied (DE); Helmut Schmidt, Saarbruecken-Guedingen (DE)

(73) Assignee: Institut fuer Neue Materialien gemeinnuetzige GmbH, Saarbruecken (DE)

( * ) Notice: Subject to any disclaimer, the term of this patent is extended or adjusted under 35 U.S.C. 154(b) by 96 days.

(21) Appl. No.: 10/111,175
(22) PCT Filed: Oct. 18, 2000
(86) PCT No.: PCT/EP00/10260
§ 371 (c)(1),
(2), (4) Date: Apr. 18, 2002
(87) PCT Pub. No.: WO01/28948
PCT Pub. Date: Apr. 26, 2001

(30) Foreign Application Priority Data

Oct. 19, 1999 (DE) .......................... 199 50 383

(51) Int. Cl.$^7$ ................................ B32B 9/04
(52) U.S. Cl. ................ 428/447; 525/523; 528/38; 528/103; 528/425
(58) Field of Search ................. 513/160, 170, 513/425; 528/38, 103, 425; 525/523; 428/447

(56) References Cited

U.S. PATENT DOCUMENTS

| | | | |
|---|---|---|---|
| 4,232,065 A | 11/1980 | Marcantonio et al. | |
| 4,287,326 A | * 9/1981 | Mikami .................. | 525/476 |
| 5,466,727 A | 11/1995 | Hsieh | |
| 5,468,317 A | 11/1995 | Hsieh | |
| 5,644,014 A | 7/1997 | Schmidt et al. | |
| 6,057,040 A | 5/2000 | Hage | |
| 6,329,019 B1 | 12/2001 | Buschmeier et al. | |
| 6,363,749 B1 | 4/2002 | Jenkner et al. | |
| 6,503,328 B1 | 1/2003 | Buschmeier et al. | |

FOREIGN PATENT DOCUMENTS

| | | |
|---|---|---|
| DE | 4118184 | 12/1992 |
| EP | 0471301 | 2/1992 |
| EP | 0482480 | 4/1992 |
| JP | 5098214 | * 4/1993 |
| JP | 9-291251 | 11/1997 |
| WO | 93/06054 | 4/1993 |
| WO | 94/29390 | 12/1994 |
| WO | 97/41966 | 11/1997 |
| WO | 98/45216 | 10/1998 |
| WO | 98/45217 | 10/1998 |
| WO | 99/37721 | 7/1999 |

OTHER PUBLICATIONS

Chemical Abstracts Abstract of JP–214, 1994.*
English Language Abstract of JP 9–291251.

* cited by examiner

Primary Examiner—Philip Tucker
Assistant Examiner—D. Aylward
(74) Attorney, Agent, or Firm—Greenblum & Bernstein, P.L.C.

(57) ABSTRACT

A coating composition comprises a polycondensate obtained by reacting a prehydrolysate based on at least on epoxide-containing hydrolysable silane; at least one amine component selected from a prehydrolysate based on at least one amino-containing hydrolysable silane and an amine compound containing at least two amino groups; and an amino group protective reagent. The coating composition is particulary suitable for coating glass, glass ceramic, ceramic, and plastic, and permits an increase in strength and protection against damage.

25 Claims, No Drawings

COATING COMPOSITION, BASED ON ORGANICALLY MODIFIED INORGANIC CONDENSATES

The present invention relates to a coating composition comprising organically modified inorganic condensates based on hydrolysable silanes containing at least one epoxide group, to a process for preparing the coating composition, to the use thereof for coating substrates, especially glass, and to substrates coated therewith.

The fracture strength of glass is drastically reduced by surface microcracks, so that the actual strength is lower by several orders of magnitude than the theoretical strength. These microcracks come about as a result of mechanical, thermal and/or chemical attack on the surface of the glass during production and processing, but also in the course of use.

It is known that the fracture strength of damaged glass can be increased further by coating, filling the microcracks with a transparent glasslike sol-gel material and/or using the coating process to produce a zone of compressive strain in the near-surface region of the glass. Studies are also known which use glass ceramic coats, metal oxide coats or else ceramic coats for increasing the strength. In general, however, these coats lack glasslike transparency, which limits their use.

It has also been found to be the case that, although these glasslike or ceramic-like coats are able to increase the fracture strength, they are unable to protect the glass against renewed damage, since their brittle fracture properties are similar to those of the underlying glass surface to which they are firmly bonded chemically via oxygen bridges. As a result, under external attack, similar damage is produced in the coating and can propagate into the glass. The same applies to applied coats of an $SiO_2$ sol-gel, irrespective of whether the coats used are thick or thin, in the $\mu$m range.

One widespread protection for glass in terms of the strength properties is that known as cold end coating with waxes, fatty acids or fatty acid esters, which is described, for example, in U.S. Pat. No. 4,232,065. Further possible treatments include the application of thin polymer coats with thicknesses of about 8 $\mu$m, as described in WO 93/6054, or the use of polysiloxane-containing wax, fatty acid or fatty acid ester coats, which are disclosed in WO 98/45217.

In order both to retard the rapid drop in strength mentioned at the outset and to obtain protection against mechanical damage in combination with sufficient slip properties, WO 97/41966 proposed coating the glass with organic polymer coats. This is done by applying polymer coats with a thickness of 80–100 $\mu$m using, for example, a powder coating material. Protection against stress cracking corrosion, however, is difficult owing to the high water permeability. Water diffuses to the polymer/glass interface where, owing to the weak attachment of the polymer, it causes the known, strength-lowering corrosion phenomena. A further grave disadvantage when using thick polymer coats is that recovery of the glass necessitates a very cumbersome procedure to separate glass from polymer, in order not to disrupt the redox equilibrium in the glass melting furnace. With polymer-coated bottles, for instance, the shards are ground to a particle size within the range of the polymer coat thickness (50 $\mu$m–100 $\mu$m) and the polymer fraction is separated off by agitation.

The object on which the invention was based was therefore to provide a coating having a high strength-maintaining effect without adversely affecting the recyclability of glass. A further requirement was, on the one hand, to achieve effective adhesion to the glass while, on the other hand, avoiding the brittleness of ceramic materials and at the same time obtaining sufficient abrasion strength.

The object according to the invention, with the diverse and divergent requirements, has surprisingly been achieved by means of a coating composition comprising a polycondensate obtainable by reacting a) a prehydrolysate based on at least one hydrolysable silane having at least one nonhydrolysable substituent, the silane containing one or more epoxide groups on at least one non-hydrolysable substituent;

b) at least one amine component selected from (1) prehydrolysates based on at least one hydrolysable silane having at least one nonhydrolysable substituent, the silane containing one or more amino groups on at least one nonhydrolysable substituent, and (2) amine compounds containing at least two amino groups, and c) an amino protective group reagent.

The invention provides coating compositions which can be used to increase the fracture strength of glass, especially damaged glass. At the same time, high abrasion-resistant coatings are obtained which, moreover, adhere effectively to glass. Nor do any problems arise with regard to the recovery of the glass.

The prehydrolysate used as component a) is based on at least one hydrolysable silane having at least one nonhydrolysable substituent, the silane containing an epoxide group on at least one nonhydrolysable substituent. This silane is a silicon compound having from 1 to 3, preferably 2 or 3, with particular preference 3, hydrolysable radicals and 1, 2 or 3, preferably 1 or 2, with particular preference one, nonhydrolysable radical(s). At least one of the nonhydrolysable radicals possesses at least one epoxide group.

Examples of nonhydrolysable radicals R containing epoxide group are in particular those which possess a glycidyl or glycidyloxy group. They can be linked to the silicon atom by way of an alkylene group, e.g. a $C_1$–$C_6$ alkylene, such as methylene, ethylene, propylene or butylene. Specific examples of hydrolysable silanes that can be used in accordance with the invention can be found, for example, in EP-A-195493. Examples of nonhydrolysable radicals without epoxide groups are the examples of the radical R" that are listed below for the general formula (III). Examples of hydrolysable radicals are the examples of the radical X that are listed below for the general formula (I).

Hydrolysable silanes with epoxide group that are particularly preferred in accordance with the invention are those of the general formula (I):

in which the radicals X, the same as or different from one another (preferably identical), stand for a hydrolysable group and are, for example, a halogen (F, Cl, Br and I, especially Cl and Br), alkoxy (especially $C_{1-4}$ alkoxy, such as methoxy, ethoxy, n-propoxy, isopropoxy and butoxy), aryloxy (especially $C_{6-10}$ aryloxy, e.g. phenoxy), acyloxy (especially $C_{1-4}$ acyloxy, such as acetoxy and propionyloxy) and alkylcarbonyl (e.g. acetyl), and R is a nonhydrolysable group containing at least one epoxide group, e.g. an aliphatic, cycloaliphatic or aromatic group, in particular an alkylene group, e.g. a $C_1$–$C_6$ alkylene, such as methylene, ethylene, propylene and butylene, containing at least one epoxide group. The radical X is preferably $C_{1-4}$ alkoxy and with particular preference methoxy and ethoxy, and R is preferably a glycidyloxy-($C_{1-6}$)-alkylene radical.

Owing to its ready availability, γ-glycidyloxypropyltrimethoxysilane (abbreviated below to GPTS) is used with particular preference. Further examples are glycidyloxypropyltriethoxysilane, glycidyloxypropylmethyldiethoxysilane and glycidyloxypropylmethyldimethoxysilane.

Component b) comprises at least one amine component selected from (1) prehydrolysates based on at least one hydrolysable silane having at least one nonhydrolysable substituent, the silane containing an amino group on at least one nonhydrolysable substituent, and (2) amine compounds containing at least two amino groups. Components (1) and (2) can be used alone or in a mixture. Component b) is preferably composed at least in part of component (1); for example, at least 20 mol % or at least 40 mol %, preferably at least 60 mol %, of component b) are component (1). With particular preference, component b) consists only of component (1).

Component (1) comprises prehydrolysates based on at least one hydrolysable silane having at least one nonhydrolysable substituent, the silane containing one or more amino groups on at least one nonhydrolysable substituent. The silane has in particular from 1 to 3, preferably 2 or 3, with particular preference 3, hydrolysable radicals and 1, 2 or 3, preferably 1 or 2, with particular preference one, nonhydrolysable radical(s). At least one of the nonhydrolysable radicals possesses at least one amino group.

Examples of nonhydrolysable radicals containing at least one amino group are listed below. Examples of nonhydrolysable radicals without amino groups are the examples of the radical R'' that are listed below for the general formula (III). Examples of hydrolysable radicals are the examples of the radical X that are listed above for the general formula (I).

Preferred aminosilanes are those of the general formula (II):

$$X_3SiR' \qquad (II)$$

in which the radicals X are defined as in the case of the general formula (I) above and R' is a nonhydrolysable, Si-bonded radical which contains at least one primary, secondary or tertiary amino group. The radical R' can comprise one, two or more amino groups. R' can, for example, be —Z—NR$^1$R$^2$, in which Z is an alkylene, e.g. a $C_1$–$C_6$ alkylene, such as methylene, ethylene, propylene and butylene, an arylene, e.g. phenylene, or a radical derived from alkylaryl or aralkyl, and R$^1$ and R$^2$ are the same or different and are hydrogen, alkyl, e.g. $C_1$–$C_6$ alkyl, such as methyl, ethyl, propyl and butyl, aryl, alkylaryl or aralkyl. R$^1$ and R$^2$ may also be linked to one another to form a ring containing nitrogen. Where appropriate, Z, R$^1$ and R$^2$ have one or more customary organic substituents. R$^1$ and/or R$^2$ may also be the group —Z'—NR'$^1$R'$^2$, in which Z' is defined like Z and R'$^1$ and R'$^2$ are defined like R$^1$ and R$^2$. Z' and Z and also R'$^1$, R'$^2$ and R$^1$, R$^2$ may each be the same or different in the same radical. In this way radicals R' having two, three or more amino groups are obtained.

Specific examples of silanes of this kind are 3-aminopropyltrimethoxysilane, 3-aminopropyltriethoxysilane, N-2-aminoethyl)-3-aminopropyltrimethoxysilane, N-[N'-(2'-aminoethyl)-2-aminoethyl]-3-aminopropyltrimethoxysilane, N-[3-(triethoxysilyl)propyl]-4,5-dihydroimidazole and [N-(2-aminoethyl)-3-aminopropyl]methyldiethoxysilane.

Component (2) comprises amine compounds containing at least two amino groups. The amino groups can in particular be primary or secondary amine compounds. Nitrogen compounds of this type may be selected, for example, from aliphatic di-, tri- or tetraamines having from 2 to 8 carbon atoms, N-heterocycles, amino-functional phenols, and polycyclic or aromatic amines. Specific examples are ethylenediamine, diethylenetriamine, triethylenetetramine, 1,6-diaminohexane, 1,6-bis(dimethylamino)-hexane, tetramethylethylenediamine, N,N,N',N'',N''-pentamethyldiethylenetriamine, 1,4-diazabicyclo[2.2.2]octane, cyclohexane-1,2-diamine, 2-(aminomethyl)-3,3,5-trimethylcyclopentylamine, 4,4'-diaminocyclohexylmethane, 2-methylimidazole, 2-phenylimidazole, 1,3-bis(aminomethyl)cyclohexane, bis(4-amino-3-methylcyclohexyl)methane, 1,8-diamino-p-menthane, 3-(aminoethyl)-3,3,5-trimethylcyclohexylamine (isophoronediamine), piperazine, piperidine, urotropine, bis(4-aminophenyl)methane and bis(4-aminophenyl) sulphone. Preferred examples are diethylenetriamine, triethylenetetramine or isophoronediamine.

The amino protective group reagent is a compound containing a functional group which can be reacted with an amino group. In particular, the functional group of the amino protective group reagent possesses a higher reactivity for the amino group than does an epoxide group. Consequently, free amino groups still present in the mixture react preferentially with the amino protective group reagent. As a result, a derivatized amine is formed which is no longer available for crosslinking. The compounds in question may comprise, for example, acid halides or acid anhydrides, e.g. carboxylic anhydrides, carbonyl halides or sulphonyl halides. The halides may comprise the acid chloride, bromide or iodide, the acid chlorides being preferred. The compounds in question may comprise anhydrides or halides of straight-chain or branched aliphatic, cycloaliphatic or aromatic carboxylic acids, e.g. anhydrides and halides of $C_1$–$C_8$ alkylcarboxylic acids, such as acetic acid, propionic acid, butyric acid and malonic acid, $C_1$–$C_8$ alkenylcarboxylic acids, such as maleic acid, or $C_6$–$C_{25}$ arylcarboxylic acids, such as phthalic acid. Specific examples are propionyl chloride, acetyl chloride, sulphonyl chloride, maleic anhydride, phthalic anhydride and acetic anhydride. In this context, acetic anhydride and acetyl chloride are particularly preferred.

Besides the hydrolysable compounds of components a) and b), other hydrolysable compounds (component d) may also be used for the construction of the inorganic matrix. These compounds are preferably added during the formation of component a). However, they can also be added together with the other components mentioned, b) and c), or as a separate component, in hydrolysed and/or condensed form.

Hereinbelow, other hydrolysable compounds are understood to be those which are not a hydrolysable silane containing at least one epoxide group or one amino group. These other compounds likewise comprise an inorganic element with hydrolysable substituents attached to it.

It is possible, for example, to use one or more other hydrolysable compounds together with the hydrolysable silane(s) containing at least one epoxide group in component a), the amount of the other hydrolysable compounds preferably not exceeding 80 mol % and in particular 60 mol %, based on the total amount of hydrolysable compounds employed.

Examples of suitable other hydrolysable compounds include hydrolysable compounds of elements selected from the third and fourth main groups (especially B, Al, Ga, Si, Ge and Sn) and the third to fifth transition groups of the Periodic Table (especially Ti, Zr, Hf, V, Nb and Ta). It is also possible, however, for other metal compounds to give advantageous results, such as compounds of Zn, Mo and W. With particular preference, these compounds are hydrolysable compounds of elements from the group Si, Ti, Zr, Al, B, Sn and V, which are hydrolysed with the hydrolysable silane(s) of component a).

All of these compounds contain hydrolysable groups. As examples, reference may be made to the examples of X that are listed in formula (I). The compounds may also contain nonhydrolysable groups in addition to the hydrolysable groups. Except for Si, however, this is not preferable. As examples, reference may be made to the examples of R" that are set out below in formula (III). The silanes which can be used may have, for example, the following general formula (III):

$$R''_n SiX_{4-n} \qquad (III)$$

in which n is 0, 1, 2 or 3, preferably 1 or 2, with particular preference 1, X can be the same or different and is as defined above for formula (I). Examples of nonhydrolysable radicals R" are alkyl, especially $C_{1-4}$ alkyl (such as methyl, ethyl, propyl and butyl), alkenyl (especially $C_{2-4}$ alkenyl, such as vinyl, 1-propenyl, 2-propenyl and butenyl), alkynyl (especially $C_{2-4}$ alkynyl, such as acetylenyl and propargyl) and aryl (especially $C_{6-10}$ aryl, such as phenyl and naphthyl), it being possible for the groups just referred to have, where appropriate, one or more substituents, such as halogen and alkoxy. The radicals R" may also carry functional groups which may, where appropriate, also be active in crosslinking. Examples of these functional groups are (meth)acryloyl, (meth)acryloyloxy, cyanate, isocyanate, hydroxyl, mercapto, sulphane, thiocyanate and isothiocyanate groups. For example, appropriate mercaptosilanes and isocyanatosilanes can be used which contribute to forming the matrix or which replace a part of the amine-epoxide network by corresponding crosslinking.

Specific examples of these other hydrolysable compounds are: $Si(OCH_3)_4$, $Si(OC_2H_5)_4$, $Si(O-n-$ or $i-C_3H_7)_4$, $Si(OC_4H_9)_4$, $SiCl_4$, $HSiCl_3$, $Si(OOCC_3H_7)_4$, $CH_3—SiCl_3$, $CH_3—Si(OC_2H_5)_3$, $C_2H_5—SiCl_3$, $C_2H_5—Si(OC_2H_5)_3$, $C_3H_7—Si(OCH_3)_3$, $C_6H_5—Si(OCH_3)_3$, $C_6H_5—Si(OC_2H_5)_3$, $(CH_3O)_3—Si—C_3H_6—Cl$, $(CH_3)_2SiCl_2$, $(CH_3)_2Si(OCH_3)_2$, $(CH_3)_2Si(OC_2H_5)_2$, $(CH_3)_2Si(OH)_2$, $(C_6H_5)_2SiCl_2$, $(C_6H_5)_2Si(OCH_3)_2$, $(C_6H_5)_2Si(OC_2H_5)_2$, $(i-C_3H_7)_3SiOH$, $CH_2=CH—Si(OOCCH_3)_3$, $CH_2=CH—SiCl_3$, $CH_2=CH—Si(OCH_3)_3$, $CH_2=CH—Si(OC_2H_5)_3$, $CH_2=CH—Si(OC_2H_4OCH_3)_3$, $CH_2=CH—CH_2—Si(OCH_3$, $CH_2=CH—CH_2—Si(OC_2H_5)_3$, $CH_2=CH—CH_2—Si(OOCCH_3)_3$, $CH_2=C(CH_3)—COO—C_3H_7—Si(OCH_3)_3$, $CH_2=C(CH_3)—COO—C_3H_7—Si(OC_2H_5)_3$, $Al(OCH_3)_3$, $Al(OC_2H_5)_3$, $Al(O-n-C_3H_7)_3$, $Al(O-i-C_3H_7)_3$, $Al(OC_4H_9)_3$, $Al(O-i-C_4H_9)_3$, $Al(O-sec-C_4H_9)_3$, $AlCl_3$, $AlCl(OH)_2$, $Al(OC_2H_4OC_4H_9)_3$, $TiCl_4$, $Ti(OC_2H_5)_4$, $Ti(OC_3H_7)_4$, $Ti(O-i-C_3H_7)_4$, $Ti(OC_4H_9)_4$, $Ti(2-ethylhexoxy)_4$; $ZrCl_4$, $Zr(OC_2H_5)_4$, $Zr(OC_3H_7)_4$, $Zr(O-i-C_3H_7)_4$, $Zr(OC_4H_9)_4$, $ZrOCl_2$, $Zr(2-ethylhexoxy)_4$, and also Zr compounds which have complexing radicals, such as β-diketone and methacryloyl radicals, $BCl_3$, $B(OCH_3)_3$, $B(OC_2H_5)_3$, $SnCl_4$, $Sn(OCH_3)_4$, $Sn(OC_2H_5)_4$, $VOCl_3$ and $VO(OCH_3)_3$.

As other hydrolysable compounds it is also possible to make use, in addition or alone, of, for example, hydrolysable silicon compounds having at least one nonhydrolysable radical that contains fluorine atoms, in particular from 5 to 30 fluorine atoms, attached to carbon atoms which are preferably separated from Si by at least two atoms. Examples of hydrolysable groups which can be used in this context are those as indicated for X in formula (I). The use of a fluorinated silane of this kind additionally confers hydrophobic and oleophobic (dirt repellency) properties on the corresponding coating. Such silanes are described in detail in DE 4118184.

Where appropriate, nanoscale inorganic particulate solids may also be present in the coating composition. Through the use of these solids it is possible, for example, to bring about further increases in the scratch resistance and chemical stability. The nanoscale inorganic particulate solids may be composed of any desired inorganic materials, but in particular are composed of metals or metal compounds such as, for example, hydrated or unhydrated oxides such as ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $Ta_2O_5$, $Nb_2O_5$, $V_2O_5$, $MoO_3$ or $WO_3$; chalcogenides such as sulphides (e.g. CdS, ZnS, PbS and $Ag_2S$), selenides (e.g. GaSe, CdSe and ZnSe) and tellurides (e.g. ZnTe or CdTe), halides such as AgCl, AgBr, AgI, CuCl, CuBr, $CdI_2$ and $PbI_2$; carbides such as $CdC_2$ or SiC; arsenides such as AlAs, GaAs and GeAs; antimonides such as InSb; nitrides such as BN, AlN, $Si_3N_4$ and $Ti_3N_4$; phosphides such as GaP, InP, $Zn_3P_2$ and $Cd_3P_2$; phosphates, silicates, zirconates, aluminates, stannates and the corresponding mixed oxides (e.g. those having a perovskite structure such as $BaTiO_3$ and $PbTiO_3$). It is possible to use one kind of nanoscale inorganic particulate solids or a mixture of different nanoscale inorganic particulate solids.

The nanoscale inorganic particulate solids preferably comprise an oxide, oxide hydrate, nitride or carbide of Si, Al, B, Zn, Cd, Ti, Zr, Ce, Sn, In, La, Fe, Cu, Ta, Nb, V, Mo or W, with particular preference of Si, Al, B, Ti and Zr. Preferred nanoscale inorganic particulate solids are boehmite, $ZrO_2$ and $TiO_2$, and titanium nitride.

The nanoscale inorganic particulate solids generally possess a particle size in the range from 1 to 300 nm or 1 to 100 nm, preferably 2 to 50 nm and with particular preference 5 to 20 nm. This material can be used in the form of a powder but is preferably used in the form of a sol (in particular an acidically stabilized sol).

Particularly when importance is placed on very good properties of high scratch resistance, the nanoscale inorganic particulate solids can be used in an amount of up to 50% by weight, based on the solid components of the coating composition. In general, the amount of nanoscale inorganic particulate solids is in the range from 1 to 40% by weight, preferably from 1 to 30% by weight, with particular preference from 1 to 15% by weight.

It is also possible to use nanoscale inorganic particulate solids which have addition-polymerizable and/or polycondensable organic surface groups. Such addition-polymerizable and/or polycondensable nanoparticles and their preparation are described, for example, in DE 19746885.

As a further component it is possible, preferably together with component a), for at least one organic monomer, oligomer or polymer containing at least two epoxide groups, or mixtures thereof, to be present. These organic monomers, oligomers or polymers containing epoxide groups comprise, for example, aliphatic, cycloaliphatic or aromatic compounds, aliphatic, cycloaliphatic or aromatic esters or ethers or mixtures thereof, based for example on ethylene glycol, 1,4-butanediol, propylene glycol, 1,6-hexanediol, cyclohexanedimethanol, pentaerythritol, bisphenol A, bisphenol F or glycerol, each containing at least two epoxide groups. They may also contain more epoxide groups, in the case of monomers or oligomers 3 or 4, for example.

Specific examples include 3,4-epoxycyclohexylmethyl, 3,4-epoxycyclohexanecarboxylate, bis(3,4-epoxycyclohexyl) adipate, cyclohexanedimethanol diglycidyl ether, glycerol triglycidyl ether, neopentyl glycol diglycidyl ether, pentaerythritol polyglycidyl ether, 2-ethylhexyl glycidyl ether, 1,6-hexanediol diglycidyl ether, polypropylene glycol diglycidyl ether, epoxy resins based on bisphenol A, epoxy resins based on bisphenol F and epoxy resins based on bisphenol A/F.

The organic monomer, oligomer or polymer containing at least two. epoxide groups is used at most in an amount of 50% by weight, e.g. in an amount of from 15 to 30% by weight, based on components a). The use of these compounds containing epoxide groups is not a preferred embodiment but may be advantageous, for example, on grounds of price.

In the coating composition there may be further additives present which are normally added in the art depending on end use and desired properties. Specific examples include solvents, colour pigments, NIR and/or IR reflecting or absorbing pigments, dyes, UV absorbers, lubricants, such as surfactants, fluorosilanes or graphite, or thermochromic dyes.

The prehydrolysates used as component a) and, where appropriate, as component b) are obtained by hydrolysing the hydrolysable compounds with water. If desired, hydrolysis may be provided by, for example, heating or adjustment to an appropriate pH. The hydrolysable radicals of the hydrolysable compounds are replaced in whole or in part by OH groups. During this procedure, condensation reactions may also take place, so that the prehydrolysates may also contain partial condensation products. Preferably, however, the hydrolysis is conducted in such a way that the progress of the condensation reaction is slow, with the consequence that storable starting components are obtained. Normally and preferably, components a) and b) are prehydrolysed separately from one another and only then combined. Naturally, however, it is also possible to carry out joint prehydrolysis of the hydrolysable compounds of components a) and b).

For the hydrolysis it is preferred to use an amount of water which is substoichiometric; i.e., an amount which is not sufficient to hydrolyse all of the hydrolysable groups present. It is possible, for example, to work with an approximately half-stoichiometric ratio (molar ratio of hydrolysable groups to $H_2O$=1:0.6 to 1:0.4).

Following the prehydrolysis and, where appropriate, partial condensation, components a) and b) are mixed with one another (provided that they are not hydrolysed jointly). The mixing ratio of component a) to component b) is preferably chosen such that the molar ratio of the epoxide groups present to the amino groups is from 7:1 to 1:1, with particular preference from 7:2 to 7:3.

After the components have been mixed, condensation and crosslinking take place. If desired, this process can be assisted by pH adjustment or heating. Condensation in this context is understood as the linking of the silanes (or of the other elements containing hydrolysable groups) by way of the condensation of the —OH groups to oxygen bridges, with the formation, for example, of polysiloxanes (inorganic condensation). The degree of condensation of the polycondensate which forms is preferably from 50 to 90%, with particular preference from 60 to 80%, in particular from 60 to 70%. Controlling the degree of condensation is known to the person skilled in the art, and can be carried out, for example, by way of the amount of water for the hydrolysis. The degree of condensation here is understood to be the percentage fraction of condensed hydrolysed or hydrolysable groups, relative to the hydrolysed or hydrolysable groups in the uncondensed state.

Additionally, crosslinking takes place between the epoxide groups and the amino groups (organic crosslinking). Over the course of time there is an increase in the degree of crosslinking and in the degree of condensation. Then, at a particular point in time, the amino protective group reagent is added. On account of its greater reactivity with the amino groups, it reacts with them to form amine derivatives which are not amenable to a crosslinking reaction, with the result that crosslinking is terminated.

The amino protective group reagent is added in an amount sufficient to derivative the amino groups that have not yet been crosslinked and so to arrest the crosslinking reaction. The point in time of its addition is chosen such that the degree of crosslinking of the resultant polycondensate, expressed as the percentage fraction of the crosslinked amino groups and epoxide groups relative to amino groups and epoxide groups in the uncrosslinked state, is from 5 to 50%, preferably from 10 to 50%, in particular from 20 to 40%. The amino protective group reagent is normally added from several minutes to several hours after combining components a) and b). Because of the acidity of the amino protective group reagent, the pH may fall when it is added.

The determination of the degrees of condensation and crosslinking is known to the person skilled in the art. The determination of the concentrations of the relevant components present in the polycondensate, and hence of the degrees of crosslinking and condensation, can be carried out, for example, by means of NMR measurement, following calibration with the starting substances. This allows the progression in the degrees of crosslinking and condensation to be monitored over time.

Where appropriate, inert solvents may be added to the compositions at any stage in their preparation for the purpose of adjusting the rheological properties. These solvents are preferably alcohols and/or alcohol ethers which are liquid at room temperature, examples being $C_1$–$C_8$ alcohols, which, moreover, are also formed during the hydrolysis of the alkoxides of the elements in question that are used with preference, or monoethers of diols such as ethylene glycol or propylene glycol with $C_1$–$C_8$ alcohols.

Preferably, following the addition of the amino protective group reagent, a polycondensate is obtained which has a degree of crosslinking of from 5 to 50% and preferably also has a degree of condensation of from 50 to 90%. This polycondensate may be used, where appropriate together with further customary additives, as a coating composition.

The substrate to be coated may, for example, be a substrate made of glass, ceramic, glass ceramic, plastic, metal or wood. It is preferably a substrate made of glass, ceramic or glass ceramic. Particular advantages are achieved in accordance with the invention using glass substrates, e.g. flat glass or hollow glassware. Practical examples include lightweight disposable hollow glass bottles, thin glass (d≦1 mm) for displays, solar cells and solar collectors.

The substrate may have been pretreated. Where appropriate, the substrate has already been provided with customary primers or coatings.

The coating composition of the invention is applied to the substrate by techniques known from the prior art. Application may take place by means of standard coating techniques, such as dipping, spreading, brushing, knife coating, rolling, spraying or spin coating, for example. In one preferred embodiment, the substrate, especially glass, is heated before application, to 80° C. for example. Where appropriate, initial partial drying at room temperature (partial removal of the solvents present) is followed by thermal treatment or consolidation, at temperatures for example of 80° C.–150° C., preferably at 100° C.–130° C., with particular preference at about 120° C.

The coat thickness of the coating composition applied to the substrate and heat-treated can be for example from 15 to 45 µm, preferably from 25 to 40 µm and in particular from 30 to 35 µm.

The coatings can if desired have high transparency and are also notable for high scratch resistance. In particular, a hard but elastic behaviour of the coating produced is obtained which is sufficient for maintenance of strength, so that an increase in the (fracture) strength is maintained even after stress.

The examples which follow are intended to illustrate the present invention but without restricting its scope.

EXAMPLE 1

Strength-maintaining coating on float glass 2 mm thick (sol 4)

Synthesis and coat application of the coating sol In a three-necked round-bottomed flask with reflux condenser and dropping funnel, 51.4 g of distilled water were added to 450 g of 3-glycidyloxypropyltrimethoxysilane (GPTS) and the mixture was heated to boiling under reflux for 24 h (molar ratio —OR:$H_2O$=1:0.5). 49 g of water were added at room temperature with vigorous stirring to 388 g of aminopropyltriethoxysilane (APTES) (molar ratio —OR:$H_2O$= 1:0.5). 50 ml of isopropanol and 50 g of the APTES prehydrolysate were added with stirring to 185 g of the GPTS prehydrolysate. After a stirring time of 20 minutes, 4.7 ml of acetic anhydride were added to this sol. The floatglasses (100 mm×100 mm×2 mm) were coated by dipping. The coats were consolidated in a drying oven at 120° C. for 10 minutes. Following this coating operation, the floatglasses were damaged with the aid of a sand trickle unit (in accordance with DIN 52 348) with 500 g of corundum of particle grade P 30. The fracture strength of the coated and damaged glasses was subsequently determined in a double ring bending test. The results were evaluated using Weibull statistical analysis. The strength-maintaining effect was tested in comparison with uncoated and damaged glasses. The damaged and undamaged glasses were analysed using what are called Weibull plots.

It is seen that the fracture strength of the uncoated flat glass is greatly impaired; for example, there is a reduction from 628 MPa (566–698 MPa) to 57 MPa (55–59 MPa), whereas the strength of the glass with the coating of the invention remains at the high level.

EXAMPLE 2

Strength-maintaining coating on hollow glassware

The coating sol was synthesized as in example 1. Coat application to the 1 l soft drink bottles tested was likewise carried out by dipcoating. The fracture strength of the bottles was determined by means of a bursting pressure instrument. In order to simulate realistic damage, the bottles were damaged using a line simulator of different times (5 min, 7 min and 15 min) and conditions (dry, wet). Following this damage, the bursting pressure strength was determined.

It was found that the bursting pressure strength of the bottles is increased by 35% as a result of the coating process, and is also maintained at this high level after 15 minutes of simulated line conditions (dry), whereas the bursting pressure strength of uncoated bottles has fallen to about 55% of the original value after just 5 minutes of simulated line conditions. The results for simulated wet line conditions (dripping water) are similar.

What is claimed is:

1. A coating composition comprising a polycondensate obtained by reacting components:
    (a) a prehydrolysate based on at least one hydrolysable silane having at least one non-hydrolysable substituent, the silane containing one or more epoxide groups on at least one non-hydrolysable substituent (an epoxide-containing silane);
    (b) at least one amine component selected from at least one of:
        (1) a prehydrolysate based on at least one hydrolysable silane having at least one non-hydrolysable substituent, the silane containing one or more amino groups on at least one non-hydrolysable substituent (an amino-containing silane), and
        (2) an amine compound containing at least two amino groups; and
    (c) an amino group protective reagent;
where a degree of crosslinking of the polycondensate, expressed as a percentage fraction of crosslinked amino groups and epoxide groups relative to amino groups and epoxide groups in the uncrosslinked state originally present in components (a) and (b), is from 5% to 50%.

2. The coating composition of claim 1, wherein the polycondensate has a degree of condensation of from 50% to 90%.

3. The coating composition of claim 2, wherein component (b) comprises (1).

4. The coating composition of claim 1, wherein component (b) comprises at least 60 mol-% of (1).

5. The coating composition of claim 1, wherein a molar ratio of the epoxide groups to the amino groups is from 7:1 to 1:1.

6. The coating composition of claim 1, wherein the epoxide-containing silane comprises a compound of formula $X_3SiR$ in which each X is independently a hydrolysable group and R is a glycidyloxy-($C_1$–$C_6$)-alkylene group.

7. The coating composition of claim 1, wherein component (b) comprises a prehydrolysate based on an amino-containing silane of formula $X_3SiR'$ in which each X is independently a hydrolysable group and R' is an non-hydrolysable radical which contains at least one primary or secondary amino group.

8. The coating composition of claim 7, wherein the epoxide-containing silane comprises at least one of glycidyloxypropyl trimethoxysilane and glycidyloxypropyl triethoxysilane.

9. The coating composition of claim 8, wherein the amino-containing silane comprises at least one of aminopropyl trimethoxysilane and aminopropyl triethoxysilane.

10. The coating composition of claim 1, wherein the polycondensate comprises a reaction product of components (a) through (c) and of at least one of an organic monomer, oligomer and polymer which contains at least two epoxy groups.

11. The coating composition of claim 1, wherein the polycondensate comprises a reaction product of components (a) through (c) and of at least one hydrolysable compound of at least one of Si, Ti, Zr, Al, B, Sn, and V, which compound is different from the epoxide-containing silane and the amino-containing silane.

12. The coating composition of claim 1, wherein component (c) comprises at least one of an acid anhydride and an acid halide.

13. The coating composition of claim 12, wherein component (c) comprises at least one of acetic anhydride and acetyl chloride.

14. The coating composition of claim 1, wherein the composition further comprises at least one of a color pigment, an NIR reflecting pigment, an NIR absorbing pigment, an IR reflecting pigment, an IR absorbing pigment, a dye, a UV absorber, a lubricant, a nanoscale inorganic particulate solid, and a thermochromic dye.

15. A process for preparing a coating composition, comprising:
(A) mixing components:
  (a) a prehydrolysate based on at least one hydrolysable silane having at least one non-hydrolysable substituent, the silane containing one or more epoxide groups on at least one non-hydrolysable substituent; and
  (b) at least one amine component selected from at least one of:
    (1) a prehydrolysate based on at least one hydrolysable silane having at least one non-hydrolysable substituent, the silane containing one or more amino groups on at least one non-hydrolysable substituent, and
    (2) an amine compound containing at least two amino groups; and
(B) subsequently adding and mixing component
  (c) an amino group protective reagent;
a time of adding and mixing component (c) being such that a degree of crosslinking of a resultant polycondensate, expressed as a percentage fraction of crosslinked amino groups and epoxide groups relative to amino groups and epoxide groups in the uncrosslinked state originally present in components (a) and (b), is from 5% to 50%.

16. The process of claim 15, wherein the polycondensate has a degree of condensation of from 50% to 90%.

17. The process of claim 16, wherein component (b) comprises (1).

18. The process of claim 15, wherein component (b) comprises at least 60 mol-% of (1).

19. The process of claim 18, wherein a molar ratio of the epoxide groups to the amino groups is from 7:1 to 1:1.

20. A method of coating a substrate selected from glass, glass ceramic, ceramic and plastic, comprising the substrate with the coating composition of claim 1.

21. A substrate coated with the coating composition of claim 1.

22. A substrate comprising a coating, wherein the coating is derived from a coating composition a polycondensate obtained by reacting components:
  (a) a prehydrolysate based on at least one hydrolysable silane having at least one non-hydrolysable substituent, the silane containing one or more epoxide groups on at least one non-hydrolysable substituent (an epoxide-containing silane);
  (b) at least one amine component selected from at least one of:
    (1) a prehydrolysate based on at least one hydrolysable silane having at least one non-hydrolysable substituent, the silane containing one or more amino groups on at least one non-hydrolysable substituent (an amino-containing silane), and
    (2) an amine compound containing at least two amino groups; and
  (c) an amino group protective reagent;
and wherein the coating has a thickness of from 15 $\mu$m to 45 $\mu$m.

23. The substrate of claim 22, wherein the substrate comprises at least one of glass, glass ceramic, ceramic and plastic.

24. The substrate of claim 22, wherein the substrate comprises flat glass.

25. The substrate of claim 22, wherein the substrate comprises hollow glassware.

* * * * *